United States Patent

Kamphausen

[15] 3,701,169
[45] Oct. 31, 1972

[54] TOILET FLUSH VALVE ASSEMBLY
[72] Inventor: Dan Kamphausen, Littleton, Colo.
[73] Assignee: Twentieth Century Products Corporation, Englewood, Colo.
[22] Filed: Nov. 25, 1969
[21] Appl. No.: 879,884

[52] U.S. Cl. ............................................. 4/57, 4/56
[51] Int. Cl. ........................................... E03d 1/34
[58] Field of Search..........4/56, DIG. 1, 57, 57 P, 67, 4/67 A, 58

[56] References Cited

UNITED STATES PATENTS

| | | | |
|---|---|---|---|
| 1,712,605 | 5/1929 | Delany | 4/56 |
| 2,584,407 | 2/1952 | Wittke | 4/56 |
| 2,705,808 | 4/1955 | Crockett | 4/56 X |
| 2,931,050 | 4/1960 | Harrison, Jr. | 4/57 |
| 3,060,451 | 10/1952 | Schulhoff, Jr. | 4/56 |
| 3,302,217 | 2/1967 | Schrock | 4/57 P |
| 3,325,828 | 6/1967 | Alexander | 4/57 P X |
| 3,368,224 | 2/1968 | Ament | 4/56 X |
| 3,490,083 | 1/1970 | Firth | 4/56 X |

Primary Examiner—Henry K. Artis
Attorney—Christel & Bean

[57] ABSTRACT

A toilet flush vale including a buoyant valve member movable toward and away from a valve seat and normally held thereagainst by the hydrostatic pressure of water in the tank. The valve member has an annular flange for seating on the valve seat, and a flexible sealing gasket is carried by the valve member a small distance below the annular flange so as to define an annular gap therebetween. A guide rod depends from the valve member in guided engagement with a guide structure below the seat. The valve member is moved away from the seat by means of a flexible line, and an external arm member connected to an overflow pipe of the flush valve assembly serves to guide the flexible line and to limit upward travel of the valve member and thereby prevent disengagement of the guide members.

8 Claims, 2 Drawing Figures

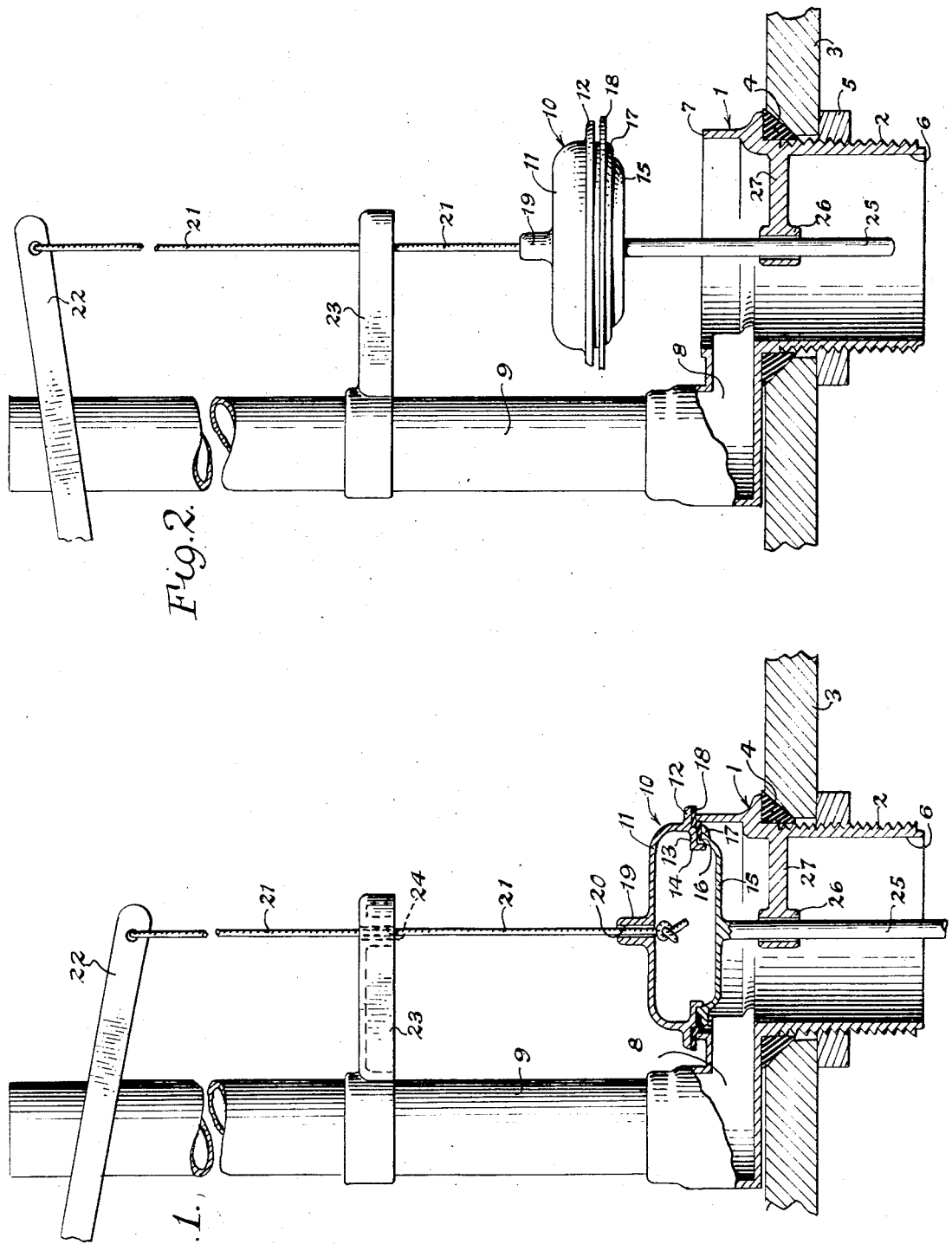

TOILET FLUSH VALVE ASSEMBLY

BACKGROUND OF THE INVENTION

This invention relates to a new and useful toilet flush valve assembly.

The usual toilet flush valve construction employs a valve member movable toward and away from a valve seat and normally held thereagainst by the hydrostatic pressure of water in the tank. Providing the requisite sealing action has been a difficult problem compounded by the fact that, as a practical matter, exact alignment of the valve member with its seat cannot be maintained. Heretofore, valve members commonly comprised a stopper ball of rubber or like resiliently flexible material which undesirably was subject to deterioration and uneven wear eventually causing improper seating with the resulting necessity of replacement. More recently valve members of plastic material have been employed which valve members advantageously are lighter in weight and generally not subject to distortion. With these plastic arrangements, it is necessary to provide a structure which insures a consistently effective seal between valve member and valve seat so as to prevent leakage.

In valve assemblies of this general type it has been found extremely advantageous to employ a flexible line connected to the valve member for selectively lifting the same away from the valve seat. One reason is that the valve member, when buoyant once lifted to open the flushing passage has a tendency to spring to full open position and float on the water being discharged. The flexible line accommodates this action. Another reason is to facilitate proper alignment of valve member and seat whereby the flexible line permits the valve member to drop freely on its seat. When a flexible line is employed, however, there must also be included a structure for limiting upward travel of the valve member.

SUMMARY OF THE INVENTION

It is, therefore, an object of the present invention to provide an improved toilet flush valve assembly having a valve member and valve seat of plastic material and of a design which insures a consistently effective seal between valve member and seat.

It is a further object of this invention to provide such a flush valve assembly wherein the valve seat can be of relatively simple construction and the valve flushing passage relatively smooth and continuous.

It is a further object of this invention to provide such a flush valve assembly wherein the upward travel of the valve member is limited by an arrangement which is relatively easy to manufacture and maintains alignment between valve member and seat.

The present invention provides a toilet flush valve having a buoyant valve member movable toward and away from a valve seat which member has an annular flange for seating on the valve seat and normally held thereagainst by the pressure of water in the tank. A sealing gasket is carried by the valve member below the flange and spaced a slight distance therefrom. A guide rod depends from the valve member in guided engagement with a guide structure below the seat. A flexible line is employed for lifting the valve member, and a single member, external to the valve passage, serves to both guide the line and limit upward travel of the valve member.

The foregoing and other advantages and characterizing features of the present invention will become clearly apparent from the ensuing detailed description of a preferred embodiment thereof taken in conjunction with the accompanying drawing wherein:

BRIEF DESCRIPTION OF THE DRAWING FIGURES

FIG. 1 is a side view, partly in elevation and partly in section, of a toilet flush valve assembly constructed in accordance with the present invention, showing the same in final closed position; and FIG. 2 is a similar view thereof, but with the valve member in open position.

DETAILED DESCRIPTION OF THE ILLUSTRATED EMBODIMENT

Referring now in detail to the exemplary embodiment illustrated in the accompanying drawing, a toilet flush valve assembly of my invention comprises a body, generally designated 1, which advantageously can be molded or otherwise formed from non-corrosive, synthetic plastic material. A nipple 2 depends from body 1 to extend through the bottom wall 3 of a toilet tank, with a sealing gasket 4 of rubber or similar material positioned between the under surface of body 1 and the tank bottom wall 3. A ring nut 5 is threaded on nipple 2 for bearing against the outer side of tank wall 3, to securely and releasably lock the assembly of my invention in position in the toilet tank.

Body 1 is formed to provide an outlet or flushing passage 6 extending downwardly therethrough and through nipple 2, and at the upper end of passage 6 body 1 is formed to provide a valve seat 7. It will be noted that passage 6 is smooth and continuous through the entire axial length thereof and that seat 7 comprises merely the relatively thin annular end face of body 1.

Body 1 is extended laterally in one direction, and is formed with a lateral passage 8 opening into outlet passage 6 at a point below valve seat 7 and communicating with an overflow pipe 9 carried by body 1 in laterally offset relation to passage 6. Pipe 9 like body 1 can be of synthetic plastic material.

A valve member 10 of hollow, two-part construction is provided and advantageously can be molded or otherwise formed from synthetic plastic. The top part includes a generally dish-shaped body portion 11 provided with a first rim or annular rigid flange 12 extending radially outwardly therefrom and a second rim or flange 13 spaced therefrom, extending radially inwardly, and terminating in a downwardly extending lip 14. Flanges 12 and 13 each are disposed in corresponding planes generally perpendicular to the axis of valve passage 6 when valve member 10 is seated, which planes are parallel and spaced slightly from each other. The bottom part of valve member 10 includes a relatively smaller, generally dish-shaped body portion 15 which terminates in an annular lip 16 and which body is provided with a rim or flange 17 extending radially outwardly and spaced slightly below the upper end of lip 16.

By virtue of this arrangement the two parts of valve member 10 are adapted to be snap-fit together and maintained in assembled condition by frictional engagement, lip 14 fitting snugly within lip 16. Of course, they can be bonded together. A relatively thin ring or gasket 18 of rubber or similar resilient, sealing material is positioned between the two parts and firmly retained so as to be carried by valve member 10 when the parts are assembled. In particular, the inner portion of sealing gasket 18 is received in the annular gap between the underside of flange 13 and the upper surface of flange 17. Gasket 18 is of a size such that it extends radially outwardly from valve body 10 a distance slightly beyond the periphery of flange 12. Gasket 18 is spaced axially a short distance from flange 12 so as to define an annular gap therebetween, as shown in FIG. 2. The lower face of gasket 18 is adapted to rest on valve seat 7 initially, and the hydrostatic pressure of water in the toilet tank will urge valve member 10 further downwardly so as to eliminate the gap between gasket 18 and flange 12 as will be described in detail hereafter. Accordingly, the size of the lower part of valve member 10, in particular the outer diameter of flange 17, should be smaller than the inner diameter of valve seat 7. Likewise, the outer diameters of flange 12 and gasket 18 both should be greater than the inner diameter of valve seat 7 so that both gasket 18 and flange 12 will seat on valve seat 7 to close passage 6 under hydrostatic pressure of water in the tank.

On the top of body portion 11, valve member 10 is formed with a boss 19 which, in turn, has an axial bore 20 to receive a flexible pull cord 21 of nylon or other plastic material knotted at one end for connection to member 10 and at the other end having connection to a lever 22 which is pivoted for movement up and down and actuated by the usual flushing handle on the exterior of the toilet tank, all in a manner well known in the art and therefore not illustrated herein. Cord 21, being completely flexible along its entire length, does not kink or cause any similar problem.

The flush valve assembly includes stop means comprising an arm member 23 adapted for connection at one end thereof to pipe 9 and extending generally horizontally into the path of upward travel of valve member 10. Arm 23 is of sufficient length so that the projecting end thereof extends slightly beyond the axis of valve passage 6, and arm 23 is provided at this end with an opening 24 through which line or cord 21 extends. Arm 23 thus functions to guide cord 21 and to limit the upward travel of valve member 10. The length of arm 23 is such as to allow for convenient replacement of member 10 as will be described hereafter.

A guide rod 25 depends from valve member 10, in particular from the under side of body portion 15, and extends down through an apertured hub 26 slidably receiving the same and forming part of guide means further comprising a spider having spokes 27 secured in flushing passage 6.

Guide rod 25 and hub 26 coact to guide valve 10 into sealing engagement with valve seat 7, maintaining the same alined when valve 10 is lifted from its seat. It is a feature of my invention that separation of guide rod 25 and hub 26 is precluded during normal use because the distance between the bottom of arm 23 and the top of hub 26 is less than the distance between the bottom end of guide rod 26 and the uppermost surface of valve member 10, which would be the top end of boss 19. In other words, hub 19 of valve member 10 engages arm 23 to stop upward movement of valve member 10 while guide rod 25 is still engaged in hub 26.

In operation, valve member 10 normally seats on the upper end of valve body 1 with the lower face of sealing gasket 18 in contact with valve seat 7 and the upper surface of gasket 18 in contact with the lower face of flange 12 as shown in FIG. 1. Valve member 10 is maintained in this position by the hydrostatic pressure of water in the toilet tank. When it is desired to flush the toilet, the usual handle is operated to lift lever 22 and thereby pull valve member 10 upwardly, lifting it away from valve seat 7. This permits the water in the tank to flow through passage 6 and flush the toilet bowl in the usual manner. As valve member 10 is lifted upwardly from seat 7, sealing gasket 18 is moved away from flange 12 a short distance creating a gap.

The upward travel of valve member 10 is limited by engagement between the top of boss 19 and the bottom of arm 23. Valve member 10 is buoyant, whereby once it is lifted from valve seat 7 it floats in open position until the water in the tank has been discharged through passage 6 whereupon it closes against valve seat 7. The guide means in the form of rod 25, hub 26 and spokes 27 remain engaged and serve to maintain valve member 10 aligned with valve seat 7 for proper seating thereon. In the initial seated position of valve member 10, the bottom surface of gasket 18 is in contact with the upper surface of valve seat 7 and a small gap or clearance exists between the top surface of gasket 18 and the bottom surface of flange 12. As water enters to fill the tank, the hydrostatic pressure of water in the toilet tank will urge valve member 10 further downwardly so as to eliminate that gap or clearance. The upper surface of gasket 18 thus comes into contact with the lower surface of flange 12 as shown in FIG. 1.

There are several unique and important advantages provided by this construction. The fact that sealing gasket 18 is carried by valve element 10 simplifies the structure of valve seat 7. Indeed, valve seat 7 merely is the relatively thin annular end face in valve body 1 defined by passage 6 therethrough. Moreover, this permits passage 6 to be relatively smooth and continuous through the entire axial length thereof which, in turn, greatly simplifies the manufacture and construction of the flush valve. In addition, the relatively smooth and continuous inner surface of passage 6 results in an efficient, smooth and quiet flow of water therethrough.

Gasket 18 is carried by valve member 10 in a manner providing an effective seal between member 10 and the horizontal seat 7. When valve member 10 is on seat 7 and forced downwardly by the hydrostatic pressure of water in the tank, the upper surface of rubber gasket 18 is in contact with the lower surface of flange 12 of plastic valve member 10. Every time valve member 10 is lifted by cord 21 to flush the toilet, gasket 18 is moved downwardly due to its resiliency and the action of water so as to be separated from flange 12.

It will be noted that the structural arrangement between gasket 18 and valve member 10 provides, in effect, a double seal on valve seat 7. When valve member 10 is seated initially on valve seat 7, the lower surface of gasket 18 is in contact with the annular end face of valve body 1 defining valve seat 7 thereby providing a single seal. Then when the hydrostatic pressure of water in the tank forces valve member 10 further downwardly, the upper surface of gasket 18 is in contact with the lower surface of flange 12 thereby completing a double seal.

Arm 23 functions both as a guide for cord 21 and as a stop to limit upward travel of valve member 10 in normal use. Arm 23 can be assembled easily in the valve of the present invention, in particular being sonically welded onto pipe 9 and therefore maintained in alignment with and properly spaced from seat 7. When it is desired to completely remove valve member 10, it is simply raised, tilted outwardly to avoid arm 23, and further withdrawn so that guide rod 25 is separated from hub 26. A new valve member 10 then is installed by reversing this procedure. A sufficient clearance exists between rod 25 and the inner bore or aperture of hub 26 so that valve member 10 when fully raised can be canted slightly thereby clearing the top of boss 19 from the underside of arm 23.

Valve member 10 is guided from underneath valve seat 7 so that it falls into the proper alignment during each use. The sealing surface between gasket 18 carried by valve member 10 and valve seat 7 being horizontal provides a more perfect seal as the weight and pressure of the water acts squarely on it. Moreover, this seal is consistent due to the guiding from underneath.

It is therefore apparent that the present invention accomplishes its intended objects. While a single specific embodiment of the present invention has been described in a this has been valve by way of illustration without thought of limitation.

I claim:

1. A toilet flush valve assembly comprising:
    a. a body having a flushing passage therethrough and adapted to be carried by a toilet tank normally containing a head of water for flushing an associated toilet bowl;
    b. a valve seat at one end of said flushing passage;
    c. an upstanding overflow pipe carried by said body in laterally offset relation to said flushing passage, said overflow pipe communicating with said flushing passage through a lateral passage opening into said flushing passage at a point below said valve seat;
    d. a buoyant valve member comprising first and second generally dish-shaped body portions adapted to be connected together by interfitting engagement, one of said body portions having an annular rigid flange for seating on said valve seat to close said flushing passage under the hydrostatic pressure of such a head of water;
    e. a flexible sealing gasket carried by said valve member and positioned between said valve member flange and said valve seat in a manner defining a relatively small gap between said gasket and said flange when said valve member is lifted from said seat;
    f. guide rod means depending from said valve member;
    g. guide means positioned in said flushing passage below said valve seat for slidably receiving said rod means; and
    h. stop means comprising an arm member connected to said overflow pipe and positioned for abutting said valve member and limiting movement of said valve member away from said valve seat to open said flushing passage, the distance between the bottom of said arm and the top of said guide means being less than the distance between the uppermost surface of said valve member and the bottom of said guide rod.

2. A flush valve assembly as defined in claim 1 further comprising a flexible line connected to said valve member and slidably received in said stop means for selectively lifting said valve member away from said valve seat.

3. A flush valve assembly as defined in claim 1 wherein the surface of said flushing passage is relatively smooth and continuous over the length thereof and wherein said valve body terminates at said one end in a relatively thin annular end face defining said valve seat.

4. A flush valve assembly as defined in claim 1 wherein said valve member is of plastic and said sealing gasket is of rubber.

5. A flush valve assembly as defined in claim 1 wherein said valve member comprises two generally dish-shaped parts adapted to be snap-fit together and wherein said gasket is positioned between said two parts.

6. A flush valve assembly as defined in claim 1 wherein said arm is of a length permitting tilting of said valve member when raised so as to physically remove said guide rod from said guide means.

7. A toilet flush valve assembly comprising:
    a. a body having a flushing passage therethrough and adapted to be carried by a toilet tank normally containing a head of water for flushing an associated toilet bowl;
    b. a valve seat at one end of said flushing passage;
    c. an upstanding overflow pipe carried by said body in laterally offset relation to said flushing passage, said overflow pipe communicating with said flushing passage through a lateral passage opening into said flushing passage at a point below said valve seat;
    d. a buoyant valve member having an annular flange for seating on said valve seat to close said flushing passage under the hydrostatic pressure of such a head of water;
    e. guide rod means depending from said valve member;
    f. guide means positioned in said flushing passage below said valve seat for slidably receiving said rod means;
    g. an arm member connected to said overflow pipe and positioned for abutting said valve member and limiting movement of said valve member away from said valve seat to open said flushing passage, the distance between the bottom of said arm and the top of said guide means being less than the distance between the uppermost surface of said valve member and the bottom of said guide rod; and
    h. a flexible line connected to said valve member and slidably received in said arm member for selectively lifting said valve member away from said valve seat.

8. A buoyant valve member for a toilet flush valve assembly including a body having a flushing passage therethrough and adapted to be carried by a toilet tank normally containing a head of water for flushing an associated toilet bowl and a valve seat at one end of said flushing passage, said buoyant valve member comprising:

a. a first, generally dish-shaped body portion having a first annular rigid flange extending radially outwardly therefrom, a second annular flange extending radially inwardly and disposed in a plane parallel to and spaced from the plane of said first flange, and an annular rib extending from the inner edge of said second flange and in a direction away from both of said flanges;

b. a shallow second dish-shaped body portion terminating in an annular lip and having an annular flange extending radially outwardly therefrom and disposed in a plane spaced from the edge of said lip, said second portion adapted to be connected to said first portion by interfitting engagement of said annular lips; and c. a flexible sealing gasket positioned between said first and second body portions and extending radially outwardly therefrom in spaced relation to said first annular flange of said first body portion;

d. whereby said gasket rests on the valve seat and is urged into contact with said first annular flange of said first body portion by the hydrostatic pressure of water in the toilet tank.

* * * * *